(12) United States Patent
Propheter-Hinckley et al.

(10) Patent No.: US 9,470,095 B2
(45) Date of Patent: Oct. 18, 2016

(54) AIRFOIL HAVING INTERNAL LATTICE NETWORK

(75) Inventors: Tracy A. Propheter-Hinckley, Manchester, CT (US); Sergio M. Loureiro, Glastonbury, CT (US); Agnes Klucha, Colchester, CT (US); Benjamin T. Fisk, East Granby, CT (US); Anita L. Tracy, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 1213 days.

(21) Appl. No.: 13/454,283

(22) Filed: Apr. 24, 2012

(65) Prior Publication Data

US 2013/0276461 A1    Oct. 24, 2013

(51) Int. Cl.
*F01D 5/16* (2006.01)

(52) U.S. Cl.
CPC ...................... *F01D 5/16* (2013.01)

(58) Field of Classification Search
CPC ............ F01D 5/147; F01D 5/18; F01D 5/12; F01D 5/14
See application file for complete search history.

(56) References Cited

U.S. PATENT DOCUMENTS

| | | | |
|---|---|---|---|
| 2,343,918 A | 5/1943 | McCoy | |
| 4,815,939 A | 3/1989 | Doble | |
| 5,038,014 A | 8/1991 | Pratt et al. | |
| 5,165,860 A | 11/1992 | Stoner et al. | |
| 5,558,497 A | 9/1996 | Kraft et al. | |
| 5,837,960 A | 11/1998 | Lewis et al. | |
| 6,391,251 B1 | 5/2002 | Keicher et al. | |
| 6,669,447 B2 | 12/2003 | Norris et al. | |
| 7,029,232 B2 | 4/2006 | Tuffs et al. | |
| 7,070,390 B2 * | 7/2006 | Powell | F01D 5/16 416/224 |
| 7,112,044 B2 | 9/2006 | Whitehead et al. | |
| 7,121,800 B2 | 10/2006 | Beattie | |
| 7,121,801 B2 | 10/2006 | Surace et al. | |
| 7,125,225 B2 | 10/2006 | Surace et al. | |
| 7,217,093 B2 | 5/2007 | Propheter et al. | |

(Continued)

FOREIGN PATENT DOCUMENTS

| EP | 0990771 | 4/2000 |
|---|---|---|
| EP | 2119871 | 11/2009 |

(Continued)

OTHER PUBLICATIONS

International Preliminary Report on Patentability for PCT Application No. PCT/US2013/036511, mailed Nov. 6, 2014.
European Search Report for European Patent Application No. 74.121543 completed Mar. 24, 2015.
International Search Report for PCT Application No. PCT/US2013-036511 completed on Feb. 11, 2014.

*Primary Examiner* — Eric Keasel
*Assistant Examiner* — Cameron Corday
(74) *Attorney, Agent, or Firm* — Carlson, Gaskey & Olds, P.C.

(57) ABSTRACT

An airfoil includes an airfoil body that defines a longitudinal axis. The airfoil body includes a leading edge and a trailing edge and a first side wall and a second side wall that is spaced apart from the first side wall. The first side wall and the second side wall join the leading edge and the trailing edge and at least partially define a cavity in the airfoil body. A lattice network connects the first side and the second side. The lattice network includes at least one enlarged node spaced apart from the first side wall and the second side wall and ribs that extend from the at least one enlarged node. Each of the ribs connects to one of the first side wall and the second side wall.

18 Claims, 5 Drawing Sheets

(56) References Cited

U.S. PATENT DOCUMENTS

| | | |
|---|---|---|
| 7,270,517 B2 | 9/2007 | Garner |
| 7,478,994 B2 | 1/2009 | Cunha et al. |
| 7,857,588 B2 | 12/2010 | Propheter-Hinckley et al. |
| 8,052,378 B2 | 11/2011 | Draper |
| 2008/0237403 A1 | 10/2008 | Kelly |
| 2008/0290215 A1 | 11/2008 | Udall et al. |
| 2009/0258168 A1 | 10/2009 | Barcock |
| 2009/0304497 A1 | 12/2009 | Meier et al. |
| 2010/0254824 A1 | 10/2010 | Naik et al. |
| 2011/0048664 A1 | 3/2011 | Kush et al. |

FOREIGN PATENT DOCUMENTS

| | | |
|---|---|---|
| GB | 2347975 | 2/2000 |
| WO | 98-35137 | 8/1998 |
| WO | 9835137 | 8/1998 |
| WO | 2011019412 | 2/2011 |

* cited by examiner

AIRFOIL HAVING INTERNAL LATTICE NETWORK

BACKGROUND

This disclosure relates to an airfoil, such as an airfoil for a gas turbine engine.

Turbine, fan and compressor airfoil structures are typically manufactured using die casting techniques. For example, the airfoil is cast within a mold that defines an exterior airfoil surface. A core structure may be used within the mold to form impingement holes, cooling passages, ribs or other structures in the airfoil. The die casting technique inherently limits the geometry, size, wall thickness and location of these structures. Thus, the design of a traditional airfoil is limited to structures that can be manufactured using the die casting technique, which in turn may limit the performance of the airfoil.

SUMMARY

An airfoil according to an exemplary aspect of the present disclosure includes an airfoil body defining a longitudinal axis. The airfoil body includes a leading edge and a trailing edge and a first side wall and a second side wall that is spaced apart from the first side wall. The first side wall and the second side wall join the leading edge and the trailing edge and at least partially define a cavity in the airfoil body. A lattice network connects the first side wall and the second side wall, the lattice network including at least one enlarged node spaced apart from the first side wall and the second side wall and ribs extending from the at least one enlarged node. Each of the ribs connecting to one of the first side wall and the second side wall.

In a further non-limiting embodiment, each of the ribs defines a central axis that is inclined relative to the longitudinal axis.

In a further non-limiting embodiment of any of the foregoing examples, at least one enlarged node has a cross-section in a direction perpendicular to the longitudinal axis that is greater in area than a cross-section of each of the ribs in the same direction.

In a further non-limiting embodiment of any of the foregoing examples, each of the ribs connects to one of the first side wall or the second side wall at an enlarged wall node.

In a further non-limiting embodiment of any of the foregoing examples, at least one enlarged node includes a plurality of enlarged nodes longitudinally spaced apart from each other.

In a further non-limiting embodiment of any of the foregoing examples, a first one of the ribs extends from a first one of the plurality of nodes and a second one of the ribs extends from a second one of the plurality of nodes, and the first rib and the second rib connect to one of the first side wall or the second side wall at a common wall node.

In a further non-limiting embodiment of any of the foregoing examples, the one of the first side wall or the second side wall that includes the common wall node includes at least one cross-rib extending from the common wall node along the one of the first side wall or the second side wall that includes the common wall node.

In a further non-limiting embodiment of any of the foregoing examples, the plurality of nodes and the ribs define at least one rectilinear opening in the lattice network.

In a further non-limiting embodiment of any of the foregoing examples, at least one enlarged node includes a plurality of enlarged nodes laterally spaced apart from each other with regard to the longitudinal axis.

A further non-limiting embodiment of any of the foregoing examples, includes a free-floating damper member adjacent the lattice network, the lattice network including at least one bearing surface contacting the free-floating damper member.

In a further non-limiting embodiment of any of the foregoing examples, the damper member is longitudinally elongated.

In a further non-limiting embodiment of any of the foregoing examples, the damper member is located adjacent the leading edge.

A turbine engine according to an exemplary aspect of the present disclosure includes optionally, a fan, a compressor section, a combustor in fluid communication with the compressor section, and a turbine section in fluid communication with the combustor. The turbine section is coupled to drive the compressor section and the fan. At least one of the fan, the compressor section and the turbine section includes an airfoil having an airfoil body defining a longitudinal axis. The airfoil body includes a leading edge and a trailing edge and a first side wall and a second side wall that is spaced apart from the first side wall. The first side wall and the second side wall join the leading edge and the trailing edge and at least partially define a cavity in the airfoil body. A lattice network connects the first side wall and the second side wall. The lattice network includes at least one enlarged node spaced apart from the first side wall and the second side wall and ribs extending from the at least one enlarged node. Each of the ribs connects to one of the first side wall and the second side wall.

In a further non-limiting embodiment of any of the foregoing examples, each of the ribs defines a central axis that is inclined relative to the longitudinal axis.

In a further non-limiting embodiment of any of the foregoing examples, each of the ribs connects to one of the first side wall or the second side wall at an enlarged wall node.

A further non-limiting embodiment of any of the foregoing examples, includes a free-floating damper member adjacent the lattice network, the lattice network including at least one bearing surface contacting the free-floating damper member.

A method for processing an airfoil according to an exemplary aspect of the present disclosure includes depositing multiple layers of a powdered metal onto one another, joining the layers to one another with reference to data relating to a particular cross-section of a blade, and producing the airfoil with an airfoil body defining a longitudinal axis. The airfoil body including a leading edge and a trailing edge and a first side wall and a second side wall that is spaced apart from the first side wall, the first side wall and the second side wall joining the leading edge and the trailing edge and at least partially defining a cavity in the airfoil body, and a lattice network connecting the first side and the second side, the lattice network including at least one enlarged node spaced apart from the first side wall and the second side wall and ribs extending from the at least one enlarged node, each of the ribs connecting to one of the first side wall and the second side wall.

An airfoil according to an exemplary aspect of the present disclosure includes an airfoil body defining a longitudinal axis. The airfoil body includes a leading edge and a trailing edge and a first side wall and a second side wall that is spaced apart from the first side wall. The first side wall and the second side wall join the leading edge and the trailing edge and at least partially define a cavity in the airfoil body. A longitudinally elongated rib connects the first side wall and the second side wall and divides the cavity into a forward section and an aft section. The longitudinally elongated rib includes at least one opening there through fluidly connecting the forward section and the aft section of the cavity. The at least one opening is located in a lateral central portion of the longitudinally elongated rib with regard to the longitudinal axis such that first and second sections of the longitudinally elongated rib bound respective lateral sides of the at least one opening. The opening defines a maximum dimension along a direction perpendicular to the longitudinal axis. The maximum dimension is greater than a minimum dimension of each of the first and second sections in the same direction.

In a further non-limiting embodiment of any of the foregoing examples, at least one opening is longitudinally elongated.

In a further non-limiting embodiment of any of the foregoing examples, at least one opening is ovular.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION OF THE PREFERRED EMBODIMENT

Figure 1:
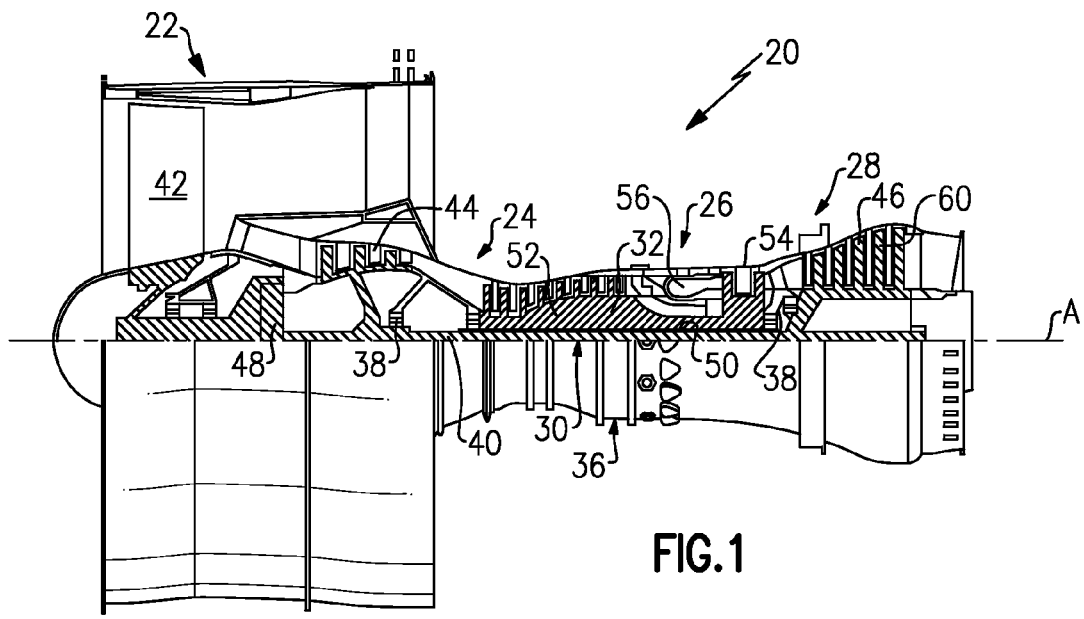
FIG. 1 shows an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 may be connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

Figure 2:
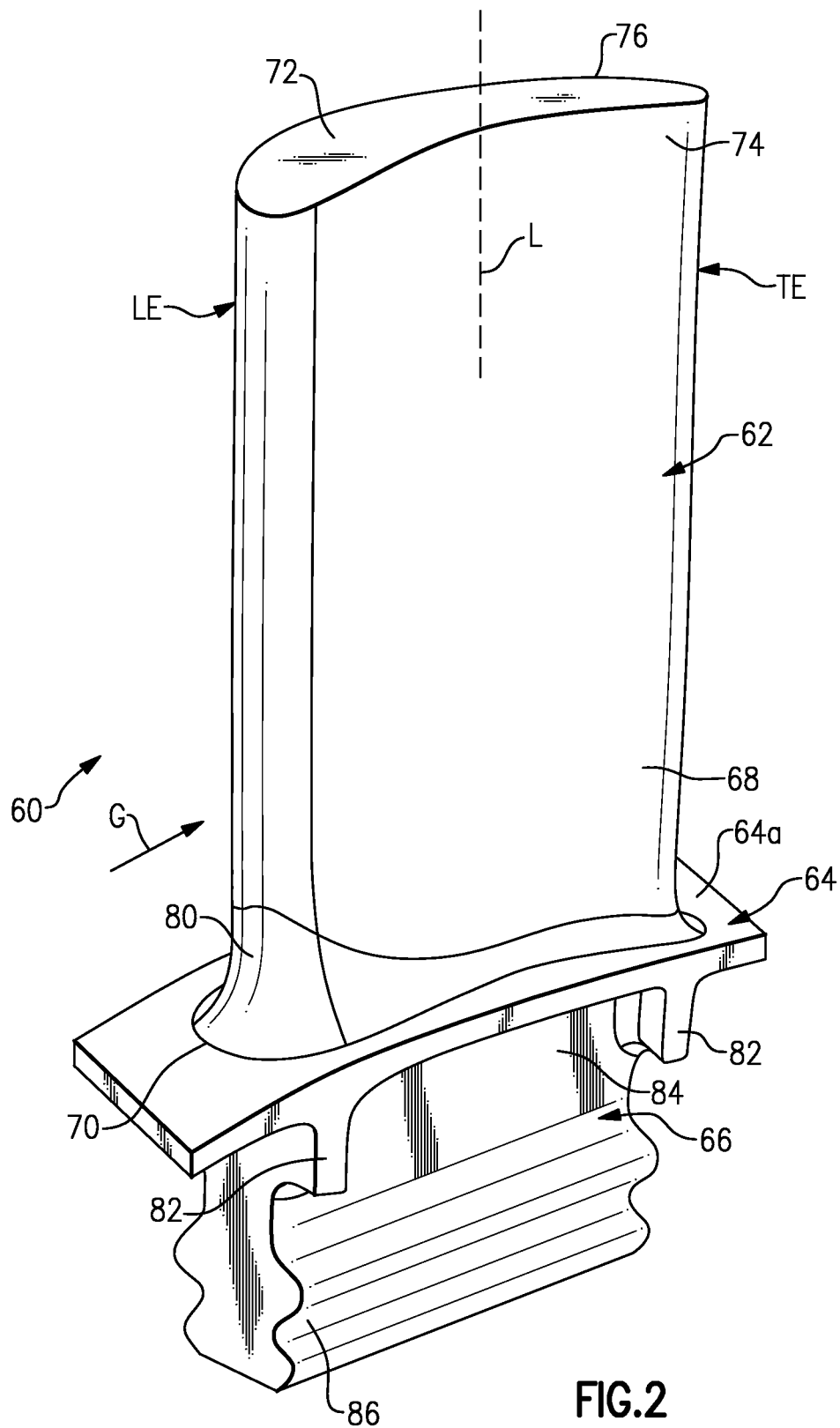
FIG. 2 shows a perspective view of an airfoil.

FIG. 2 illustrates an example airfoil 60. In this example, the airfoil 60 is a turbine blade of the turbine section 28. The airfoil 60 may be mounted on a turbine disk in a known manner with a plurality of like airfoils. Alternatively, it is to be understood that although the airfoil 60 is depicted as a turbine blade, the disclosure is not limited to turbine blades and the concepts disclosed herein are applicable to turbine vanes, compressor airfoils (blades or vanes) in the compressor section 24, fan airfoils in the fan section 22 or any other airfoil structures. Thus, some features that are particular to the illustrated turbine blade are to be considered optional.

The airfoil 60 includes an airfoil portion 62, a platform 64 and a root 66. The platform 64 and the root 66 are particular to the turbine blade and thus may differ in other airfoil structures or be excluded in other airfoil structures.

The airfoil 60 includes a body 68 that defines a longitudinal axis L between a base 70 at the platform 64 and a tip end 72. The longitudinal axis L in this example is perpendicular to the engine central axis A. The body 68 includes a leading edge (LE) and a trailing edge (TE) and a first side wall 74 (pressure side) and a second side wall 76 (suction side) that is spaced apart from the first side wall 74. The first side wall 74 and the second side wall 76 join the leading edge (LE) and the trailing edge (TE) and at least partially define a cavity 78 (FIG. 3) in the body 68.

The airfoil portion 62 connects to the platform 64 at a fillet 80. The platform 64 connects to the root 66 at buttresses 82. The root 66 generally includes a neck 84 and a serration portion 86 for securing the airfoil 60 in a disk.

It should be understood that relative positional terms such as "forward," "aft," "upper," "lower," "above," "below," "circumferential," "radial" and the like are with reference to the normal operational attitude and engine central axis A, unless otherwise indicated. Furthermore, with reference to the engine 20, the tip end 72 of the airfoil 60 is commonly referred to as the outer diameter of the airfoil 60 and the root 66 is commonly referred to as the inner diameter of the airfoil 60. The platform 64 includes an upper surface 64a that bounds an inner diameter of a gas path, generally shown as G, over the airfoil portion 62. Some airfoils may also include a platform at the tip end 72 that bounds an outer diameter of the gas path G.

Figure 3:
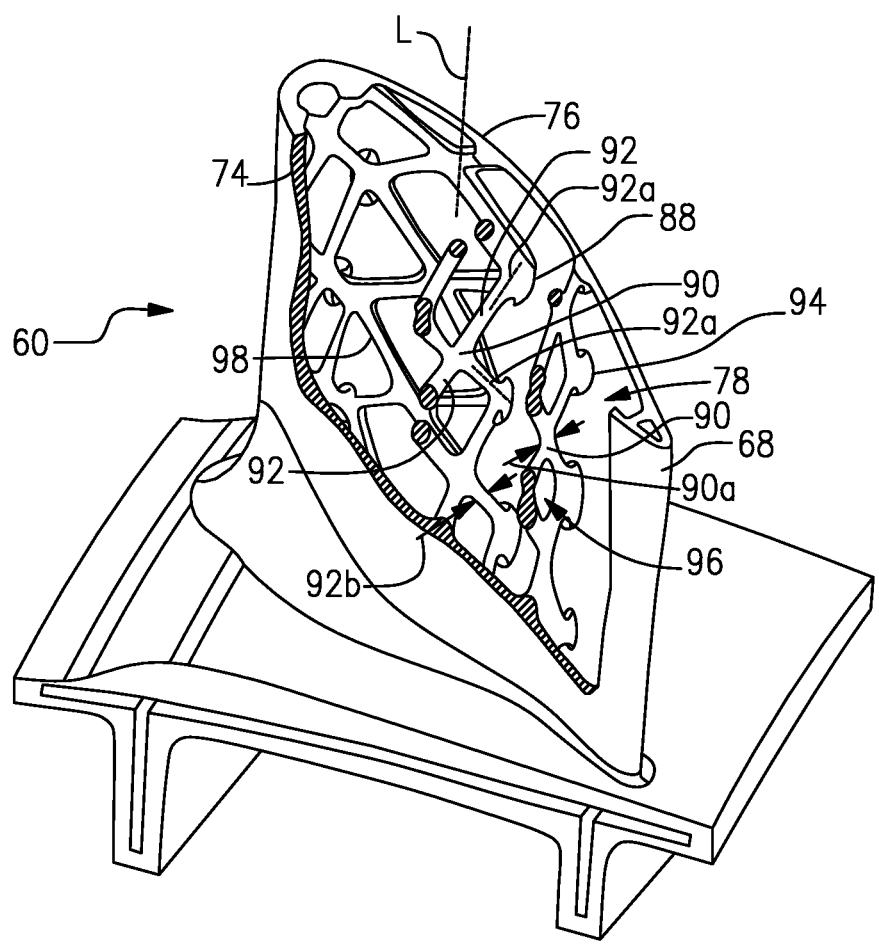
FIG. 3 shows the airfoil of FIG. 2 with a portion cutaway to reveal an internal cavity.

FIG. 3 shows the airfoil 60 with a portion cutaway to reveal the cavity 78. A lattice network 88 is enclosed within the cavity 78 and connects the first side wall 74 and the second side wall 76. The lattice network 88 includes at least one enlarged node 90 spaced apart from the first side wall 74 and the second side wall 76 and ribs 92 that extend from the enlarged node 90. Each of the ribs 92 connects to one of the first side wall 74 or the second side wall 76.

In this example, each of the ribs 92 extends along a respective central axis 92a that is inclined relative to the longitudinal axis L of the airfoil body 68. Moreover, each of the ribs 92 is discrete and is thus individually distinct with regard to other ribs 92, the enlarged node 90, the side walls 74 and 76 or other structures.

In this example, the lattice network 88 includes a plurality of the enlarged nodes 90, although the lattice network 88 could alternatively include only a single enlarged node 90 or additional enlarged nodes 90 depending on the degree of reinforcement desired. Each enlarged node 90 is longitudinally spaced apart from at least one other enlarged node 90 and is also laterally spaced apart from at least one other enlarged node 90.

Each of the enlarged nodes 90 defines a cross-sectional area, represented at 90a, along a direction perpendicular to the longitudinal axis L. Similarly, each of the ribs 92 defines a respective cross-sectional area, represented at 92b, along the same perpendicular direction. The cross-sectional area 90a is larger than the cross-sectional area 92b. Thus, the nodes 90 are enlarged with respect to the ribs 92.

Each of the ribs 92 extends to and connects with an enlarged wall node 94 on one of the first side wall or the second side wall 76. The enlarged wall node 94 is enlarged with respect to the cross-sectional areas 92b of the ribs 92, similar to the enlarged nodes 90. Another of the ribs 92 that extends from a different one of the enlarged nodes 90 also connects with the enlarged wall node 94 such that at least two ribs 92 connect to the first side wall 74 or the second side walls 76 at a common one of the enlarged wall nodes 94.

In this example, the inclinations of the ribs 92 form rectilinear openings 96 in the lattice network 88. If the airfoil 60 is a cooled structure, the rectilinear openings 96 permit air flow through the cavity 78. Additionally, the rectilinear openings 96 provide a weight reduction in the airfoil 60 in comparison to a solid support structure.

The lattice network 88 serves to reinforce the side walls 74 and 76. For example, using the additive manufacturing method that will be described below, the side walls 74 and 76 can be made with a through-thickness that is not obtainable using traditional die casting techniques. For example, the side walls 74 and 76 may have a through-thickness of 0.010 inches/254 micrometers to 0.060 inches/1524 micrometers, or specifically 0.015 inches/381 micrometers or less. The lattice network 88 reinforces the side walls 74 and 76 to prevent buckling and limit vibration, for example. Furthermore, the inclination of the ribs 92 provides a self-supporting structure with regard to pressures generated over the areas of the lattice network 88 during engine 20 operation and thus, additional support structure is not needed to support the lattice network 88 within the cavity 78.

Optionally, the first side wall 74, the second side wall 76 or both additionally include one or more cross-ribs 98 that extend along the respective side wall 74 or 76 from the enlarged wall nodes 94. For example, the cross-ribs 98 define an increased thickness of, respectively, the first side wall 74 or the second side wall 76 and extend partially across the cavity 78 toward the other of the first side wall 74 or second side wall 76. The cross-ribs 98 serve to further reinforce the side walls 74 and 76.

Figure 4:
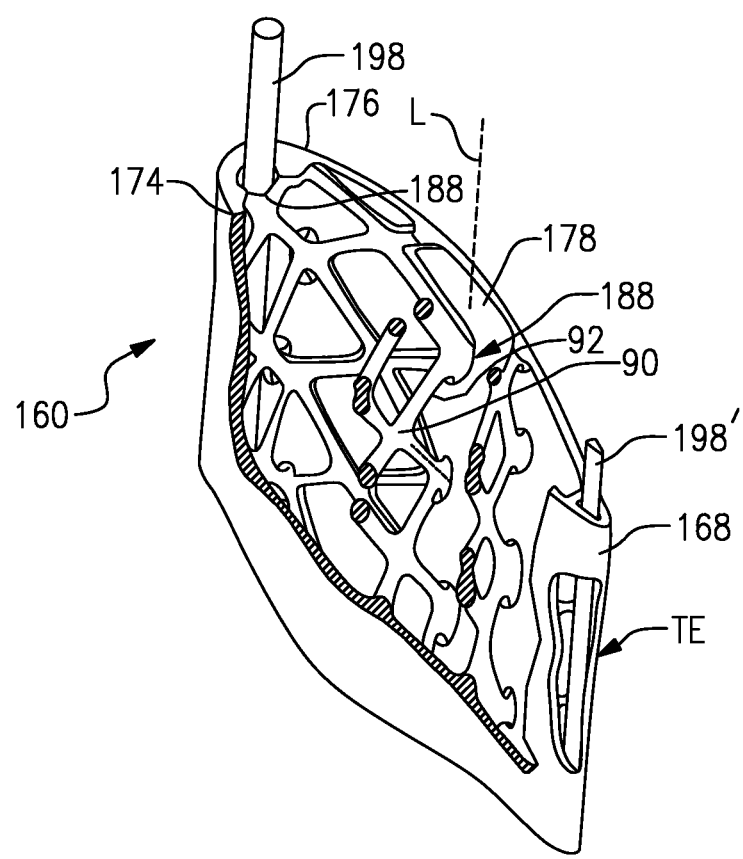
FIG. 4 shows a portion of another example airfoil with a portion cutaway to reveal an internal cavity and free-floating damper member.

FIG. 4 illustrates another example airfoil 160 with a portion cutaway to reveal a cavity 178. In this disclosure, like reference numerals designate like elements where appropriate and reference numerals with the addition of one-hundred or multiples thereof designate modified elements that are understood to incorporate the same features and benefits of the corresponding elements. In this example, the airfoil 160 further includes a free floating damper member 198 adjacent the lattice network 188. The free-floating damper member 198 in this example is longitudinally elongated with regard to the longitudinal axis L. The lattice network 188 includes at least one bearing surface 188a that, upon rotation of the airfoil 160, contacts the free-floating damper member 198. The free-floating damper 198 may also contact the side walls 174 and 176. The term "free-floating" as used in this disclosure refers to the damper member 198 being free of any rigid connections to the side wall 74 and 74, or other structures, within the cavity 178 such that the damper member 198 is free to move within the confines of other structures in the cavity 178.

For example, during operation of the engine 20, the airfoil 160 rotates about engine central axis A and the damper member 198 is thrown longitudinally outwardly such that the damper member 198 contacts the bearing surface or surfaces 188a of the lattice network 188. The contact causes friction between the bearing surface or surfaces 188a of the lattice network 188 and the damper member 198. The friction removes energy from the system and thus mitigates vibrations in the airfoil 160.

Optionally, as shown in FIG. 4, the airfoil 160 includes an additional damper member 198' that, in this example, is located adjacent the trailing edge (TE) of the airfoil 160. The free-floating damper member 198 is located adjacent the leading edge (LE) of the airfoil 160. It is to be understood, however, that the free-floating damper member 198 and additional damper member 198' may alternatively be located in other positions within the cavity 178, to provide dampening at certain locations or tailor dampening to predetermined target vibrational modes.

Figure 5:
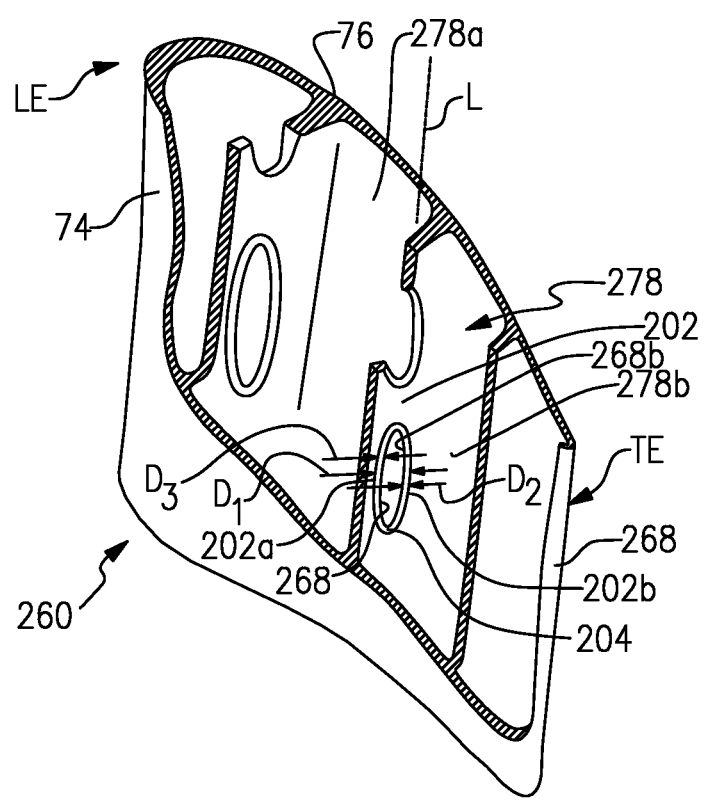
FIG. 5 shows another example airfoil having a longitudinally elongated rib.

FIG. 5 illustrates another example airfoil 260. In this example, the airfoil 260 includes one or more longitudinally elongated ribs 202 that connect the first side wall 74 and the second side wall 76. Each longitudinally elongated rib 202 divides the cavity 278 into a forward section 278a and an aft section 278b. The longitudinally elongated rib 202 includes at least one opening 204 there through that fluidly connects the forward section 278a and the aft section 278b of the cavity 278. In this example, the airfoil 260 includes a plurality of such longitudinally elongated ribs 202 and each of the longitudinally elongated ribs 202 may include one or more openings 204. Each of the openings 204 is longitudinally elongated and, in this example, is ovular.

Each of the openings 204 is located in a lateral central portion of the longitudinally elongated rib 202 with respect to a direction perpendicular to the longitudinal axis L such that first and second sections 202a and 202b of the longitudinally elongated rib 202 bound respective lateral sides 268a and 268b of the opening 268. The opening 204 defines a maximum dimension $D_1$ along a direction perpendicular to the longitudinal axis L. Each of the first and second sections 202a and 202b of the longitudinally elongated rib 202 define a minimum dimension in a same perpendicular direction, represented, respectively, at $D_2$ and $D_3$. The maximum dimension $D_1$ of the opening 204 is greater than the each of the minimum dimensions $D_2$ and $D_3$.

Figure 6:
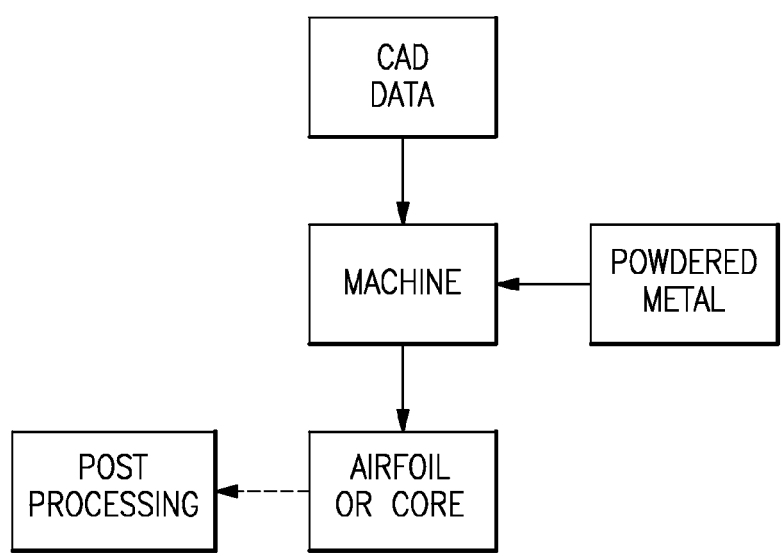
FIG. 6 shows a method of processing an airfoil using an additive manufacturing process.

The geometries disclosed herein may be difficult to form using conventional casting technologies. Thus, a method of processing an airfoil having the features disclosed herein includes an additive manufacturing process, as schematically illustrated in FIG. 6. Powdered metal suitable for aerospace airfoil applications is fed to a machine, which may provide a vacuum, for example. The machine deposits multiple layers of powdered metal onto one another. The layers are selectively joined to one another with reference to Computer-Aided Design data to form solid structures that relate to a particular cross-section of the airfoil. In one example, the powdered metal is selectively melted using a direct metal laser sintering process or an electron-beam melting process. Other layers or portions of layers corresponding to negative features, such as cavities or openings, are not joined and thus remain as a powdered metal. The unjoined powder metal may later be removed using blown air, for example. With the layers built upon one another and joined to one another cross-section by cross-section, an airfoil or portion thereof, such as for a repair, with any or all of the above-described geometries, may be produced. The airfoil may be post-processed to provide desired structural characteristics. For example, the airfoil may be heated to reconfigure the joined layers into a single crystalline structure.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An airfoil comprising:
   an airfoil body defining a longitudinal axis, the airfoil body including a leading edge and a trailing edge and a first side wall and a second side wall that is spaced apart from the first side wall, the first side wall and the second side wall joining the leading edge and the trailing edge and at least partially defining a cavity in the airfoil body;
   a lattice network connecting the first side wall and the second side wall, the lattice network including at least one enlarged node spaced apart from the first side wall and the second side wall and ribs extending from the at least one enlarged node, each of the ribs connecting to one of the first side wall and the second side wall; and
   and a free-floating damper member adjacent the lattice network, the lattice network including at least one bearing surface contacting the free-floating damper member.

2. The airfoil as recited in claim 1, wherein each of the ribs defines a central axis that is inclined relative to the longitudinal axis.

3. The airfoil as recited in claim 1, wherein the at least one enlarged node has a cross-section in a direction perpendicular to the longitudinal axis that is greater in area than a cross-section of each of the ribs in the same direction.

4. The airfoil as recited in claim 1, wherein each of the ribs connects to one of the first side wall or the second side wall at an enlarged wall node.

5. The airfoil as recited in claim 1, wherein the at least one enlarged node includes a plurality of enlarged nodes longitudinally spaced apart from each other.

6. The airfoil as recited in claim 5, wherein a first one of the ribs extends from a first one of the plurality of nodes and a second one of the ribs extends from a second one of the plurality of nodes, and the first rib and the second rib connect to one of the first side wall or the second side wall at a common wall node.

7. The airfoil as recited in claim 6, wherein the one of the first side wall or the second side wall that includes the common wall node includes at least one cross-rib extending from the common wall node along the one of the first side wall or the second side wall that includes the common wall node.

8. The airfoil as recited in claim 5, wherein the plurality of nodes and the ribs define at least one rectilinear opening in the lattice network.

9. The airfoil as recited in claim 1, wherein the at least one enlarged node includes a plurality of enlarged nodes laterally spaced apart from each other with regard to the longitudinal axis.

10. The airfoil as recited in claim 1, wherein the damper member is longitudinally elongated.

11. The airfoil as recited in claim 10, wherein the damper member is located adjacent the leading edge.

12. The airfoil as recited in claim 1, wherein the free-floating damper member is longitudinally elongated and is located adjacent the at least one enlarged node.

13. The airfoil as recited in claim 12, wherein the at least one enlarged node includes the bearing surface.

14. The airfoil as recited in claim 12, wherein the free-floating damper member extends through the lattice network.

15. A turbine engine comprising:
   a compressor section;
   a combustor in fluid communication with the compressor section; and
   a turbine section in fluid communication with the combustor, the turbine section being coupled to drive the compressor section and the fan, and
   at least one of the fan, the compressor section and the turbine section including an airfoil having an airfoil body defining a longitudinal axis, the airfoil body including a leading edge and a trailing edge and a first side wall and a second side wall that is spaced apart from the first side wall, the first side wall and the second side wall joining the leading edge and the trailing edge and at least partially defining a cavity in the airfoil body, a lattice network connecting the first side wall and the second side wall, the lattice network including at least one enlarged node spaced apart from the first side wall and the second side wall and ribs extending from the at least one enlarged node, each of the ribs connecting to one of the first side wall and the second side wall, and a free-floating damper member adjacent the lattice network, the lattice network including at least one bearing surface contacting the free-floating damper member.

16. The turbine engine as recited in claim 15, wherein each of the ribs defines a central axis that is inclined relative to the longitudinal axis.

17. The turbine engine as recited in claim 15, wherein each of the ribs connects to one of the first side wall or the second side wall at an enlarged wall node.

18. A method for processing an airfoil, the method comprising:

depositing multiple layers of a powdered metal onto one another;

joining the layers to one another with reference to data relating to a particular cross-section of a blade; and producing the airfoil with an airfoil body defining a longitudinal axis, the airfoil body including a leading edge and a trailing edge and a first side wall and a second side wall that is spaced apart from the first side wall, the first side wall and the second side wall joining the leading edge and the trailing edge and at least partially defining a cavity in the airfoil body, a lattice network connecting the first side and the second side, the lattice network including at least one enlarged node spaced apart from the first side wall and the second side wall and ribs extending from the at least one enlarged node, each of the ribs connecting to one of the first side wall and the second side wall, and a free-floating damper member adjacent the lattice network, the lattice network including at least one bearing surface contacting the free-floating damper member.

* * * * *